United States Patent
Johnson

(10) Patent No.: US 11,187,449 B2
(45) Date of Patent: *Nov. 30, 2021

(54) SYSTEM AND METHOD FOR DYNAMICALLY DETERMINING REFRIGERANT FILM THICKNESS AND DYNAMICALLY CONTROLLING REFRIGERANT FILM THICKNESS AT ROLLING-ELEMENT BEARING OF AN OIL FREE CHILLER

(71) Applicant: TRANE INTERNATIONAL INC., Davidson, NC (US)

(72) Inventor: Jay H. Johnson, Houston, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 215 days.

This patent is subject to a terminal disclaimer.

(21) Appl. No.: 16/436,166

(22) Filed: Jun. 10, 2019

(65) Prior Publication Data

US 2019/0293334 A1    Sep. 26, 2019

Related U.S. Application Data

(63) Continuation of application No. 15/383,307, filed on Dec. 19, 2016, now Pat. No. 10,317,121.

(Continued)

(51) Int. Cl.
*F04D 27/00* (2006.01)
*F25B 49/02* (2006.01)
(Continued)

(52) U.S. Cl.
CPC .......... *F25B 49/025* (2013.01); *F04D 27/001* (2013.01); *F04D 29/059* (2013.01);
(Continued)

(58) Field of Classification Search
None
See application file for complete search history.

(56) References Cited

U.S. PATENT DOCUMENTS 3,749,456 A   7/1973 Whitaker
4,318,179 A   3/1982 Kure-Jensen et al.
(Continued)

FOREIGN PATENT DOCUMENTS

CN    1181490 A    5/1998
CN    1322289 A    11/2001
(Continued)

OTHER PUBLICATIONS

Extended European Search Report, European Patent Application No. 16204562.9, dated Jun. 7, 2017 (7 pages).

(Continued)

*Primary Examiner* — Paul B Yanchus, III
(74) *Attorney, Agent, or Firm* — Hamre, Schumann, Mueller & Larson, P.C.

(57) ABSTRACT

Methods are directed towards dynamically determining refrigerant film thickness at the rolling-element bearing and for dynamically controlling refrigerant film thickness at the rolling-element bearing. Further, an oil free chiller system is configured for dynamically determining refrigerant film thickness at the rolling-element bearing of the oil free chiller system, wherein the oil free chiller system is also configured for dynamically controlling refrigerant film thickness at the rolling-element bearing of the oil free chiller system.

20 Claims, 3 Drawing Sheets

Related U.S. Application Data

(60) Provisional application No. 62/268,761, filed on Dec. 17, 2015.

(51) Int. Cl.

| | | |
|---|---|---|
| F16C 33/66 | (2006.01) | |
| F04D 29/059 | (2006.01) | |
| F04D 29/063 | (2006.01) | |
| F04D 29/58 | (2006.01) | |
| F16N 15/00 | (2006.01) | |
| F16N 29/00 | (2006.01) | |
| F16C 37/00 | (2006.01) | |
| F25B 31/00 | (2006.01) | |
| F25B 31/02 | (2006.01) | |
| G05B 19/406 | (2006.01) | |
| F16C 19/54 | (2006.01) | |

(52) U.S. Cl.
CPC ......... *F04D 29/063* (2013.01); *F04D 29/584* (2013.01); *F16C 33/6692* (2013.01); *F16C 37/007* (2013.01); *F16N 15/00* (2013.01); *F16N 29/00* (2013.01); *F25B 31/002* (2013.01); *F25B 31/02* (2013.01); *G05B 19/406* (2013.01); *F05D 2260/821* (2013.01); *F16C 19/546* (2013.01); *F25B 2500/16* (2013.01); *F25B 2500/19* (2013.01); *F25B 2600/0253* (2013.01); *F25B 2600/23* (2013.01); *F25B 2700/21156* (2013.01); *G05B 2219/50324* (2013.01); *Y02B 30/70* (2013.01)

(56) References Cited

U.S. PATENT DOCUMENTS

| | | | |
|---|---|---|---|
| 4,511,837 A | 4/1985 | Vermeiren et al. | |
| 4,728,943 A | 3/1988 | Vermeiren | |
| 5,001,435 A | 3/1991 | Smith | |
| 5,044,167 A * | 9/1991 | Champagne | F25B 40/02 62/115 |
| 6,176,092 B1 | 1/2001 | Butterworth et al. | |
| 6,279,340 B1 | 8/2001 | Butterworth et al. | |
| 6,431,843 B1 | 8/2002 | Dudley | |
| 6,488,479 B1 | 12/2002 | Berger | |
| 6,546,785 B1 | 4/2003 | Discenzo | |
| 6,564,560 B2 | 5/2003 | Butterworth et al. | |
| 7,071,834 B2 | 7/2006 | Matsuyama et al. | |
| 7,552,799 B2 | 6/2009 | Sherrington | |
| 10,317,121 B2 * | 6/2019 | Johnson | F04D 29/584 |
| 2003/0047386 A1 | 3/2003 | Sherrington | |
| 2007/0189650 A1 | 8/2007 | Moeller | |
| 2016/0265820 A1 | 9/2016 | Groshek | |

FOREIGN PATENT DOCUMENTS

| | | |
|---|---|---|
| CN | 1933935 A | 3/2007 |
| EP | 0159742 A1 | 10/1985 |
| EP | 1217216 A2 | 6/2002 |
| EP | 1260775 A2 | 11/2002 |
| JP | H01-176897 A | 7/1989 |
| JP | 2009-63397 A | 3/2009 |
| JP | 2014-228378 A | 12/2014 |

OTHER PUBLICATIONS

European Examination Report, European Patent Application No. 16204562.9, dated Apr. 2, 2020 (6 pages).

\* cited by examiner

SYSTEM AND METHOD FOR DYNAMICALLY DETERMINING REFRIGERANT FILM THICKNESS AND DYNAMICALLY CONTROLLING REFRIGERANT FILM THICKNESS AT ROLLING-ELEMENT BEARING OF AN OIL FREE CHILLER

BACKGROUND

Some refrigeration chillers are oil-based lubrication systems that employ oil to lubricate a bearing. In such chillers, a portion of the oil adheres to a and is maintained on the bearing surfaces as a film for a relatively long period of time after the chiller and its active oil delivery system is shutdown. As such, when oil is used as a bearing lubricant, at least some of the oil will remain on the bearing surfaces to provide for initial bearing lubrication when the chiller starts up again. Such residual oil can, to at least some extent, be relied upon to lubricate the bearings until the chiller's oil delivery system comes to actively provide oil to the bearing locations. In contrast, an oil free chiller is a type of a refrigeration chiller that, in some cases, may employ a centrifugal compressor, wherein impellers are mounted on a shaft for rotation using rolling element bearings lubricated only by the refrigerant which constitutes the working fluid of the chiller system. Accordingly, the liquid refrigerant is provided (1) to the rolling element bearings (e.g., immediately upon chiller start-up, during chiller operation, and during a coastdown period subsequent to shutdown of the chiller); and (2) to the drive motor of the chiller's compressor for motor cooling purposes. A variable speed-driven motor can be used in the refrigeration chiller to drive the compressor. The oil free chiller does not require or employ an oil-based lubrication system. Accordingly, when refrigerant is used as a bearing lubricant, little or no residual refrigerant remains on the bearing surfaces when the chiller system shuts down (the refrigerant drains away from or boils off of the bearing surfaces leaving an essentially dry bearing). Thus, oil free chillers have unique difficulties and challenges both at chiller start-up and subsequent to chiller shutdown.

BRIEF SUMMARY

Oil free centrifugal chillers require adequate liquid refrigerant delivery to the bearings to maintain adequate film thickness in the bearing contact zone. Methods described herein are directed to processes for dynamically determining refrigerant film thickness at a rolling-element bearing of an oil free chiller. The term "dynamically" is used herein to mean "in real time." Further, the methods described herein are directed to processes for dynamically controlling refrigerant film thickness at the rolling-element bearing of the oil free chiller.

Some of the embodiments described herein are directed to an oil free chiller system that is configured for dynamically determining refrigerant film thickness at the rolling-element bearing of the oil free chiller system. Further, some of the embodiments described herein are directed to an oil free chiller system that is configured for dynamically controlling refrigerant film thickness at the rolling-element bearing of the oil free chiller system.

DETAILED DESCRIPTION

Figure 1:
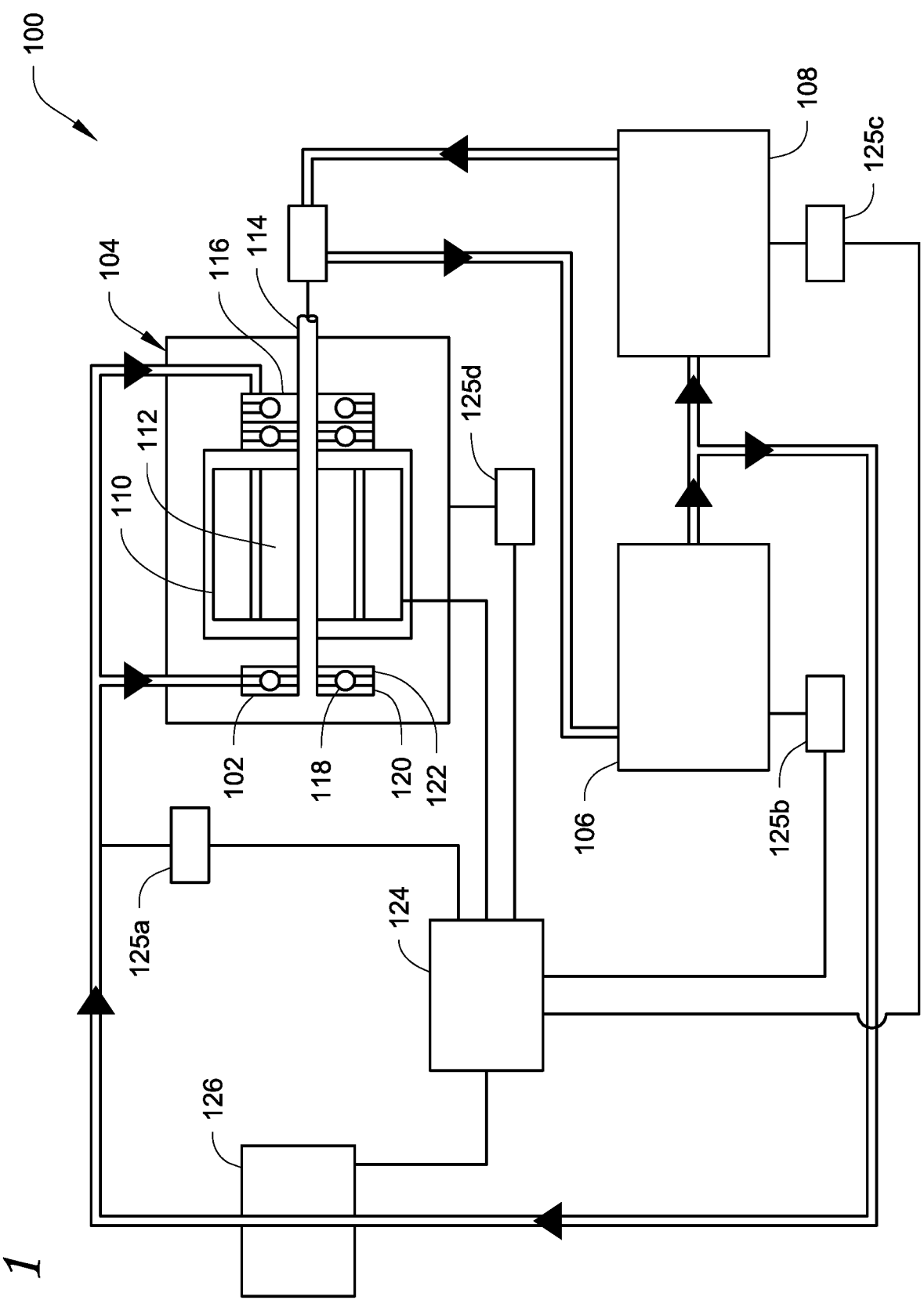
FIG. 1 shows an oil free chiller system according to an embodiment.

The present invention may be further understood with reference to the following description and the appended drawings, wherein like elements are referred to with the same reference numerals.

FIG. 1 shows an oil free chiller 100 that is configured for dynamically determining refrigerant film thickness at the rolling-element bearing 102. Further, the oil free chiller 100 is also configured for dynamically controlling refrigerant film thickness at the rolling-element bearing 102. The oil free chiller 100 has a compressor 104, a condenser 106, an evaporator 108, and other components (as described below). The refrigerant gas from the evaporator 108 is compressed by the compressor 104, and then directed to the condenser 106. The heat exchange process occurs at the condenser 106, wherein hot, compressed refrigerant gas is condensed to a cooler liquid. The condensed refrigerant (liquid) is directed to flow out from the condenser 106 to other components of the chiller 100. An embodiment of the oil free chiller 100 is a centrifugal chiller. An embodiment of the compressor 104 is a variable speed centrifugal compressor.

The compressor 104 has a drive motor 110 connected to a rotor 112. The drive motor 110 is mounted to rotate on a shaft 114. The shaft 114 is mounted to rotate in at least one bearing 102. In some embodiments, a bearing package 116 having multiple bearings is included. The bearing 102 has rolling elements 118 and races 120, 122. Each of the bearings of the bearing package 116 can be the same or similar to the bearing 102. Accordingly, in some embodiments, each of the bearings in the bearing package 116 has rolling elements and races that are the same or similar to the rolling elements 118 and races 120, 122 of the bearing 102. The bearing 102 (also the bearings in the bearing package 116) can be a hybrid bearing, wherein the rolling elements 118 are made of a ceramic material, and races 120, 122 are made of steel. In this embodiment, the refrigerant, which is the working fluid of the chiller, is provided to the bearing 102 (also the bearings in the bearing package 116) as the lubricant. Oil is not provided or present at the bearing 102 as a lubricant. Thus, the bearing 102 (also the bearings in the bearing package 116) is "oil free." A film of the refrigerant is formed at the bearing 102 (also the bearings in the bearing package 116) and acts as an elastohydrodynamic film between the rolling elements 118 and the races 120, 122.

In the example of the chiller 100 shown in FIG. 1, the refrigerant (liquid) is directed to flow to the bearing 102 and/or the bearing package 116 from a location between the condenser 106 and the evaporator 108. However, it will be appreciated that different configurations of the chiller 100 are also possible wherein the refrigerant (liquid) is directed to flow from a location other than from the location between the condenser 106 and the evaporator 108. For example, although not shown, another embodiment includes a flow path from the condenser 106 to the bearing 102 and/or the bearing package 116 that is separate from the flow path from the condenser 106 to the evaporator 108 (shown in FIG. 1). For example, although not shown, another embodiment includes a container which receives the refrigerant (liquid)

from the condenser 106, and then the refrigerant (liquid) is directed to flow to the bearing 102 and/or the bearing package 116.

The oil free chiller 100 includes a computerized controller device 124 in communication with (e.g., receiving data from) sensor devices 125a, 125b, 125c, 125d, and a refrigerant liquid temperature affecting device 126.

The sensor device 125a is a temperature (T) sensor measuring the liquid refrigerant temperature from the condenser 106 to the rolling-element bearing 102 for lubrication. The sensor device 125b measures the condenser pressure (Pc) at the condenser 106. The sensor device 125c measures the pressure at the evaporator pressure (Pe) at the evaporator 108. The sensor device 125d measures (directly or indirectly) the RPM of the compressor 104 rotational speed.

The computerized controller device 124 receives T from the sensor device 125a and Pc from the sensor device 125b, and determines the dynamic viscosity (N) of the refrigerant fluid as described below (by using predetermined constants related to bearing geometry (Rr) and load (F), and also other constants related to E, H, I, and J; the constants can be varied according to compressor displacement or other factors).

In some embodiments, the refrigerant liquid temperature affecting device 126 is a heat exchanger, preferably a braze plate heat exchanger. In these embodiments, the refrigerant liquid enters one side of the heat exchanger, and a fluid of lower temperature enters another side of the heat exchanger, and the fluid of lower temperature removes heat from the refrigerant liquid. A lower temperature fluid could be sourced from an economizer or an evaporator. The lower temperature fluid could be, but does not necessarily need to be, a liquid refrigerant.

In some embodiments, any one or more of the component(s) of the chiller can act as a source of the refrigerant, and the refrigerant can be in any phase and/or temperature at the source and then modified by a modifier to the phase and/or temperature as need.

For example, the source of refrigerant may be any location of the chiller that is fluidly downstream of the condenser in instances of obtaining substantially liquid refrigerant. In other examples, the source of refrigerant may be from a location that has a mixture of refrigerant vapor and liquid, or vapor alone, such as for instance when a phase or temperature affecting device (e.g. 126) may be employed. Such chiller component(s) that may act as the source include but are not limited to the heat exchangers, receivers, reservoirs, refrigerant lines, pumps, and the like.

The computerized controller device 124 is configured for controlling various components of the chiller 100. That is, for example, the computerized controller device 124 is configured for controlling the drive motor 110 (e.g., the speed of rotation of the shaft) and/or the refrigerant liquid temperature affecting device 126 (e.g., the temperature of the liquid refrigerant being provided to the bearing 102). By controlling these components (and associated properties of the liquid refrigerant), the computerized controller device 124 can control the film thickness of the liquid refrigerant at the bearing 102. Accordingly, the computerized controller device 124 can control the various components of the chiller 110 so that adequate (which is used herein to include a particular volume, a particular temperature, a particular phase, or a combination thereof, etc.) liquid refrigerant is provided to the bearing 102 for maintaining an adequate film thickness in the bearing 102 contact zone (i.e., between the rolling elements 118 and the races 120, 122). Because the computerized controller device 124 is configured for dynamically controlling the various components of the chiller 100 (e.g., the drive motor 110, the refrigerant liquid temperature affecting device 126, etc.), the refrigerant film thickness at the bearing 102 can be dynamically controlled by the computerized controller device 124. Further, the computerized controller device 124 is configured for dynamically (i.e., as the film thickness changes as the chiller 100 is in operation) determining refrigerant film thickness at the bearing 102.

The computerized controller device 124 determines, dynamically, the film thickness at the bearing 102 by detecting (directly or indirectly) a speed of the bearing's 102 rotation (e.g., bearing diameter multiplied by rotation speed of the shaft, rotor, etc.), and detecting and/or determining the temperature of the liquid refrigerant (e.g., temperature of the liquid refrigerant provided to the bearing 102 and/or temperature of the liquid refrigerant detected, directly or indirectly, at the bearing 102, etc.). Further, the computerized controller device 124 can be preset (e.g., stored in a non-transitory computer-readable medium) with various properties of the liquid refrigerant, wherein the properties of the liquid refrigerant include, for example but are not limited to, viscosity, absolute viscosity as a function of temperature, Young's Modulus (e.g., which can be assumed to be a constant), pressure viscosity coefficient, one or more minimum film thickness values ($h_{min}$), etc. The computerized controller device 124 is configured for dynamically determining viscosity and pressure viscosity as a function of fluid refrigerant temperature. Further, the computerized controller device 124 dynamically detects the speed of rotation (e.g., bearing diameter×rotational speed). From these, the computerized controller device 124 dynamically determines the film thickness at the bearing 102.

Further, the computerized controller device 124 has stored in the non-transitory computer-readable medium one or more threshold film thickness value(s) that is(are) to be achieved by the chiller 100. For example, different operation conditions of the chiller (e.g., at start up, at coast, at shutdown, at various load conditions, etc.) may require different threshold film thicknesses. The threshold film thickness can be, for example, a minimum film thickness, a maximum film thickness, a desired film thickness, etc. The embodiment described below is directed to the threshold being the minimum threshold. It will be appreciated that other types of thresholds can be achieved with some modification to the embodiment described in detail below. It will also be appreciated that the threshold film thickness as referred to herein may be a value or a range of values.

When the computerized controller device 124 determines that the film thickness is below the minimum film thickness (or otherwise above and/or not at the threshold film thickness, or in cases when the threshold film thickness type is not the minimum), the computerized controller device 124 affects changes in the operation of the chiller 100 (e.g., by controlling one or more components of the chiller 100) to bring the film thickness to at least the threshold film thickness, e.g., the minimum film thickness in this embodiment. If this cannot be achieved, the computerized controller device 124 can shut down (i.e., stop) the chiller 100 to prevent damage to components of the chiller 100.

An embodiment of the chiller 100 includes the computerized controller device 124 applying the following equation (Formula 1) transformed to a computerized instruction set for performing a specialized function of determining an actual refrigerant film thickness ($h_{actual}$) provided to the bearing 102. Formula 1 is an elastohydrodynamic lubrication (EHL) equation.

$$h_{actual} = AR(1 - e^{Bk})\left[\frac{Nv}{ER_r}\right]^C (\alpha E)^D \left(\frac{F}{ER_r^2}\right)^G \qquad \text{Formula 1}$$

wherein:
A, B, C, D, and G are constants;
e is the Euler's constant (base of the natural logarithm (in));
$R_r$ is a curvature radius of an inner bearing race;
R is the speed of rotation (bearing diameter×rotational speed);
v is the mean rolling velocity of the ball and inner race (e.g., meter/second);
k is the Boltzmann constant;
E is the Young's Modulus, which can be assumed to be a constant;
F is the bearing rolling element load parameter (e.g., in Newton), which has a relatively weaker influence on $h_{actual}$ than other variables, so F can be assumed to be a constant (however, F could be made to be a variable if desired);
N is the dynamic viscosity of the liquid refrigerant, wherein the dynamic viscosity is a function of pressure and temperature of the liquid refrigerant at the bearing. Accordingly, N can also be written as N(P,T), wherein $N(P,T) = N_0 \cdot e^{\alpha(P,T)p}$, wherein $N_0$ is the absolute viscosity of the liquid refrigerant; and
α is the pressure viscosity of the liquid refrigerant.

The pressure viscosity is a coefficient defined for each refrigerant fluid, and has a relationship with temperature (which may be obtained experimentally and fit to the following relationship:

$$\alpha = C_1 - C_2 T + C_3 T^2$$

wherein $C_1$, $C_2$, and $C_3$ are constants determined by a curve fit of experimental data), and T is temperature. Accordingly, the pressure viscosity can be determined as a function of temperature.

Accordingly, the actual film thickness is affected by temperature of the refrigerant fluid and rotation speed. Then, the computerized controller device 124 determines what the actual film thickness would be under such conditions (e.g., the bearing's 102 lubricant fluid temperature and rotation speed).

During operation of the chiller 100, the computerized controller device 124 determines the dynamic viscosity and the pressure viscosity from the refrigerant fluid temperature, and determines the rotation speed (e.g., receive speed information from a sensor, a control unit, or, for example, a variable frequency drive (VFD) motor that detects and/or determines the rotation speed).

Thus, computerized controller device 124 can dynamically determine the actual film thickness ($h_{actual}$) based on the relationship shown in Formula 1.

For example, in some embodiments of the computerized controller device 124, the computerized instruction set, for performing the specialized function of determining the actual refrigerant film thickness ($h_{actual}$) to be provided to the bearing 102 of the chiller 100, uses the following constants: A is set to 3.63, B is set to −0.68, C is set to 0.68, D is set to 0.49, and G is set to −0.073.

Thus, applying these constants to Formula 1, the minimum film thickness can be set to the following relationship:

$$h_{actual} = 3.63R(1 - e^{-0.68k})\left[\frac{Nv}{ER_r}\right]^{0.68} (\alpha E)^{0.49} \left(\frac{F}{ER_r^2}\right)^{-0.073}$$

In other embodiments of the chiller 100, the computerized controller device 124 applies the following equation (Formula 2) transformed to a computerized instruction set for performing a specialized function of determining an actual refrigerant film thickness ($h_{actual}$) provided to the bearing 102. Formula 2 is an isoviscous-elastic lubrication equation. Formula 2 does not depend on the pressure viscosity (α in Formula 1). Isoviscous lubrication occurs when the contact pressure causes deformation between one or more interacting surfaces (e.g., rolling elements 118 and the races 120, 122), but the pressure is low enough to not cause a significant change in lubricant viscosity.

$$h_{actual} = HR\left[\frac{Nv}{ER_r}\right]^I \left[\frac{F}{ER_r^2}\right]^J \qquad \text{Formula 2}$$

wherein:
H, I, and J are constants;
e is the Euler's constant (base of the natural logarithm (in));
$R_r$ is the curvature radius of the inner bearing race (e.g., meter);
R is the speed of rotation (bearing diameter×rotational speed);
v is the mean rolling velocity of the ball and inner race (e.g., meter/second);
E is the Young's Modulus, which can be assumed to be a constant;
F is the bearing rolling element load parameter (e.g., in Newton), which has a relatively weaker influence on $h_{actual}$ than other variables, so F can be assumed to be a constant (however, F could be made to be a variable if desired); and
N is the dynamic viscosity of the liquid refrigerant.

For example, in some embodiments of the computerized controller device 124, the computerized instruction set, for performing the specialized function of determining the actual refrigerant film thickness ($h_{actual}$) provided to the bearing 102 of the chiller 100, uses the following constants: H is set to 2.8, I is set to 0.65, and J is set to −0.21. Thus, applying these constants to Formula 2, the actual film thickness can be set to the following relationship:

$$h_{actual} = 2.8R\left[\frac{Nv}{ER_r}\right]^{0.65} \left[\frac{F}{ER_r^2}\right]^{-0.21}$$

Further, the actual film thickness ($h_{actual}$) can also be determined by measuring a capacitance of the refrigerant fluid via a sensor device, and then determining the film thickness of the refrigerant fluid based on the measured capacitance. For example, sensor can be placed on the outer race of the bearing and another sensor placed on the corresponding shaft. The bearing must be isolated from other metal parts on the sides. The sensor then measures the film thickness between the outer race and ball as well as the inner race and ball.

Accordingly, during operation of the chiller 100, when the computerized controller device 124 determines that the actual film thickness ($h_{actual}$) (e.g., detected film thickness and/or determined film thickness) is below a minimum film thickness ($h_{min}$) for a first certain (e.g., predetermined, determined, preset, set, configured, known, etc.) amount of time (e.g., 6 seconds), the computerized controller device 124 alters the operation of the chiller 100 to increase the film thickness to keep the chiller 100 in operation. For example, one or more minimum film thickness values ($h_{min}$) can be predetermined value(s) stored in the non-transitory computer-readable medium of the computerized controller device 124. For example, the computerized controller device 124 can have one predetermined value for $h_{min}$, so that $h_{actual}$ is dynamically determined and compared to this one $h_{min}$ value, and then provide appropriate controls in response to the comparison between $h_{actual}$ and $h_{min}$. The appropriate controls can be, for example, the computerized controller device 124 increasing a speed of fluid flow in the chiller 100 in order to build a thicker film. For example, certain components, such as guide vanes, can also be operated to close to control capacity of the chiller 100 to avoid cycling the machine off. As another example (or as a secondary control scheme), a cooling circuit for the liquid refrigerant can be activated to lower the temperature of the liquid refrigerant, which would increase the viscosity and the pressure viscosity properties of the liquid refrigerant. Each of these control schemes can be used by the computerized controller device 124 independently or in conjunction with one another. If the actual film thickness ($h_{actual}$) is below the minimum film thickness ($h_{min}$) for a second certain (e.g., predetermined, determined, preset, set, configured, known, etc.) amount of time (e.g., 60 seconds), the computerized controller device 124 shuts down the chiller 100. An example of the computerized process applied by the computerized controller device 124 is shown in FIG. 2.

In some embodiments, during operation of the chiller 100, when the computerized controller device 124 determines that the actual film thickness ($h_{actual}$) (e.g., detected film thickness and/or determined film thickness) is the same and/or above the minimum film thickness ($h_{min}$), the computerized controller device 124 does not alter the operation of the chiller 100 to increase the film thickness.

Figure 2:
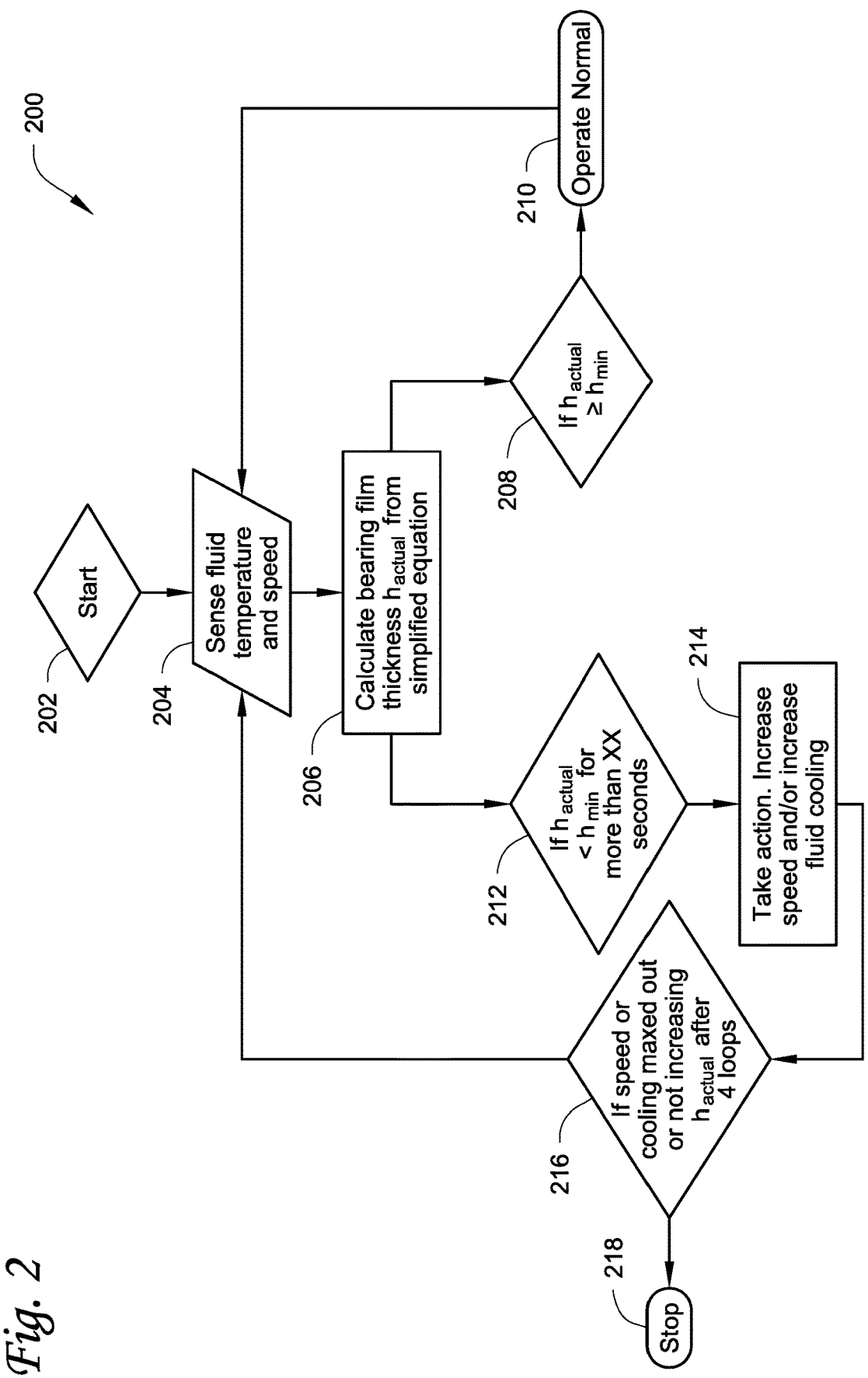
FIG. 2 shows a flowchart of a method for dynamically determining and controlling refrigerant film thickness at a rolling-element bearing of an oil free chiller according to an embodiment.

FIG. 2 shows a flowchart 200 of an embodiment of the methods for dynamically determining the actual refrigerant film thickness at a rolling-element bearing of an oil free chiller and for dynamically controlling refrigerant film thickness at the rolling-element bearing of the oil free chiller. In an embodiment, the flowchart 200 can be used for actual film thickness values in range from $0.2 \times 10^{-8}$ meters to $3.5 \times 10^{-8}$ meters. If used in an oil lubricated arrangement, the actual film thickness values can be in range of $0.1 \times 10^{-6}$ meters to $1 \times 10^{-5}$ meters.

A computerized controller device (e.g., 124 shown in FIG. 1) of the oil free chiller (e.g., 100 shown in FIG. 1) applies Formula 1 and/or Formula 2 (shown above) transformed to a computerized instruction set for performing a specialized function of dynamically determining an actual refrigerant film thickness ($h_{actual}$) provided to the bearing (e.g., 102 shown in FIG. 1). The computerized controller device starts 202 the process, and proceeds to a step 204 of sensing (e.g., detects and/or determines) the refrigerant fluid temperature and rotational speed of the bearing. Then, at the next step 206, the computerized controller device determines the actual lubricant film thickness ($h_{actual}$), which is the film thickness under the conditions of the refrigerant fluid temperature and rotational speed of the bearing detected and/or determined in step 204. It will be appreciated that the capacitance measurement may be used instead of the Formulas 1 or 2 in the computerized instruction set to determine the actual lubricant film thickness ($h_{actual}$).

In step 208, the computerized controller device has determined that $h_{actual} \geq h_{min}$. Thus, the computerized controller device allows chiller to operate as it is (proceeds to step 210). Accordingly, from step 210, the computerized controller device can loop back to the step 204 of sensing the refrigerant fluid temperature and rotational speed of the bearing.

However, when the computerized controller device has determined that $h_{actual} < h_{min}$ (for a certain amount of time, such as for example, at least 6 seconds), as shown in step 212, then, at step 214, the computerized controller device takes an action (or actions) to increase the $h_{actual}$. For example, the computerized controller device can increase the rotation speed and/or increase refrigerant fluid cooling (i.e., lower the refrigerant fluid temperature via, for example, the refrigerant liquid temperature affecting device 126 shown in FIG. 1). Then, at step 216, a count can be kept by the computerized controller device to determine how many times the "take action" step 214 has been taken. For example, at step 216, the computerized controller device has determined that the speed and/or the fluid cooling have been maximized and yet the "take action" step 214 is still triggered, then, the computerized controller device can proceed to the step 218 of stopping the chiller. In addition or alternatively, the computerized controller device can keep track of how many times the "take action" step 214 has been triggered (e.g., 4 times), or how much time has transpired since the first "take action" step 214 has been triggered in the continuance triggering of the "take action" step 214 (e.g., 60 seconds), and the computerized controller device can proceed to the step 218 of stopping the chiller under these condition(s).

Otherwise, from step 216, the computerized controller device can loop back to the step 204 of sensing the refrigerant fluid temperature and rotational speed of the bearing.

In some embodiments, the flowchart 200 can be modified so that the steps 206, 208, and 212 are based on a comparison of the actual film thickness ($h_{actual}$) to a threshold film thickness value (or range), and based on that comparison, the computerized controller device can proceed to either step 210 or step 216 as desired.

Figure 3:
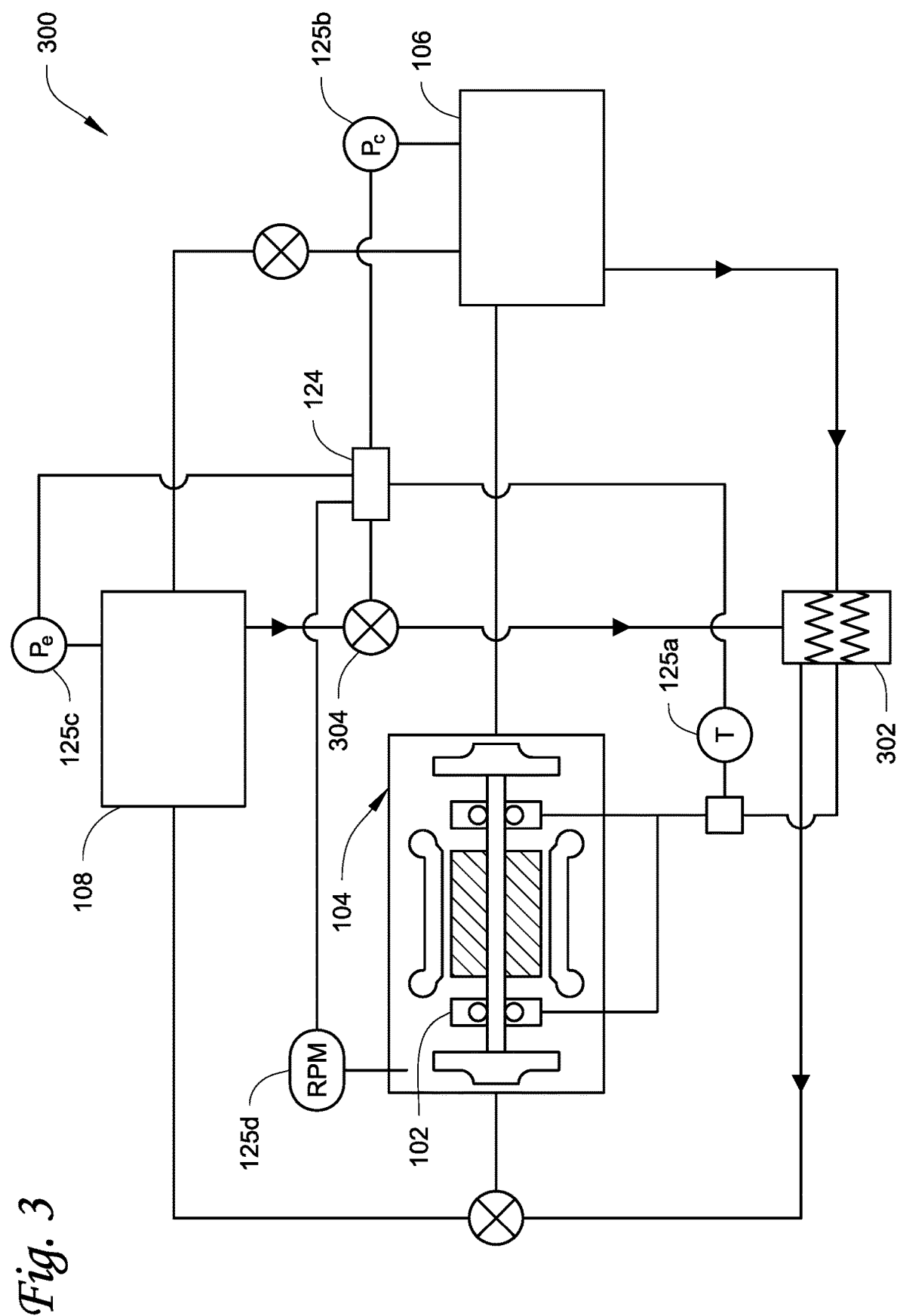
FIG. 3 shows an oil free chiller system according to another embodiment.

FIG. 3 shows another embodiment of an oil free chiller 300 having similar components as the oil free chiller 100 shown in FIG. 1 and described above. The oil free chiller 300 includes a heat exchanger 302 as the refrigerant liquid temperature affecting device (e.g., 126 in FIG. 1). The oil free chiller 300 includes a computerized controller device 124 in communication with (e.g., receiving data from) sensor devices 125a, 125b, 125c, 125d, and the heat exchanger 302. The sensor device 125a is a temperature (T) sensor measuring the liquid refrigerant temperature from the condenser 106 to the rolling-element bearing 102 for lubrication. The sensor device 125b measures the condenser pressure (Pc) at the condenser 106. The sensor device 125c measures the pressure at the evaporator pressure (Pe) at the evaporator 108. The sensor device 125d measures (directly or indirectly) the RPM of the compressor 104 rotational speed.

The computerized controller device 124 receives T from the sensor device 125a and Pc from the sensor device 125b, and determines the dynamic viscosity (N) of the refrigerant fluid as described below (by using predetermined constants related to bearing geometry (Rr) and load (F), and also other constants related to E, H, I, and J; the constants can be varied according to compressor displacement or other factors).

From the data received from the sensor devices 125a, 125b, 125c, 125d, and the fixed constants, the computerized controller device 124 determines (e.g., measures) the actual film thickness ($h_{actual}$), and when the computerized controller device 124 determines that $h_{actual}$ is below $h_{min}$, the computerized controller device 124 takes action by opening valve 304 to allow a cooler fluid to pass into the heat exchanger 302. This causes lowering of the temperature of the liquid refrigerant lubricating the rolling-element bearing 102. The lowering of the temperature of the liquid refrigerant increases the dynamic viscosity of the fluid. The computerized controller device 124 allows this controlled cooling process to continue until sufficient viscosity is achieved (i.e., the $h_{actual}$ is equal to or above $h_{min}$), and then the computerized controller device 124 closes the valve 304. Further, if sufficient viscosity not achieved even after some time has passed after the valve 304 has been opened, the computerized controller device 124 increase the rotational speed of the compressor 104 (e.g., RPM).

Aspects

The embodiments are described in the following aspects. It is noted that any of the features in any of the aspects below can be combined with any of the other aspects.

Aspect 1. A computerized controller device for an oil free chiller configured for dynamically determining an actual refrigerant film thickness at a bearing of the oil free chiller during operation of the oil free chiller, and for controlling other components of the oil free chiller to change a refrigerant film thickness at the bearing or an operation of the oil free chiller, when the actual refrigerant film thickness is different from a threshold refrigerant film thickness.

Aspect 2. The computerized controller device as in aspect 1, wherein the computerized controller device controls the other components of the oil free chiller so that the change of the refrigerant film thickness at the bearing is an increase of the refrigerant film thickness, when the actual refrigerant film thickness is below the threshold refrigerant film thickness.

Aspect 3. The computerized controller device as in any one or combinations of the aspects 1-2, wherein the threshold refrigerant film thickness is a predetermined minimum refrigerant film thickness.

Aspect 4. The computerized controller device as in any one or combinations of the aspects 1-3, wherein the computerized controller device determines the actual refrigerant film thickness at the bearing of the oil free chiller during operation of the oil free chiller based only on temperature and rotation speed of the bearing.

Aspect 5. The computerized controller device as in any one or combinations of the aspects 1-4, wherein the computerized controller device applies Formula 1 transformed to a computerized instruction set for performing a specialized function of determining the actual refrigerant film thickness ($h_{actual}$):

$$h_{actual} = AR(1 - e^{Bk}) \left[ \frac{Nv}{ER_r} \right]^C (\alpha E)^D \left( \frac{F}{ER_r^2} \right)^G \quad \text{Formula 1}$$

wherein:
A, B, C, D, and G are constants;
e is the Euler's constant;
$R_r$ is a curvature radius of an inner bearing race;
R is a speed of rotation;
k is the Boltzmann constant;
E is a Young's Modulus;
F is a load parameter;
N is a dynamic viscosity;
v is a mean rolling velocity of a ball and the inner bearing race; and
α is a pressure viscosity.

Aspect 6. The computerized controller device as in any one or combinations of the aspect 1-5, wherein the computerized controller device applies Formula 2 transformed to a computerized instruction set for performing a specialized function of determining the actual refrigerant film thickness ($h_{actual}$):

$$h_{actual} = HR \left[ \frac{Nv}{ER_r} \right]^I \left[ \frac{F}{ER_r^2} \right]^J \quad \text{Formula 2}$$

wherein:
H, I, and J are constants;
e is the Euler's constant;
$R_r$ is a curvature radius of an inner bearing race;
R is a speed of rotation;
E is a Young's Modulus;
F is a load parameter;
N is a dynamic viscosity; and
v is a mean rolling velocity of a ball and the inner bearing race.

Aspect 7. An oil free chiller system, comprising the computerized controller device according to any one or combinations of the aspects 1-6, wherein the computerized controller device controls an operation of a motor of the oil free chiller system and/or operation of a refrigerant liquid temperature affecting device.

Aspect 8. The oil free chiller system as in aspect 7, further comprising:
a sensor configured for measuring the capacitance of the refrigerant fluid, wherein the capacitance is communicated to the computerized controller device; and
the computerized controller device configured for determining a dynamic actual film thickness of the refrigerant fluid at the bearing based on the capacitance.

Aspect 9. A method for controlling a lubricant film thickness at a bearing of a motor, comprising:
a computerized controller device determining a refrigerant fluid temperature at a bearing of a chiller;
the computerized controller device determining a rotational speed of the bearing;
the computerized controller device of the chiller determining an actual lubricant film thickness ($h_{actual}$) based on the refrigerant fluid temperature and the rotational speed;
the computerized controller device having a threshold lubricant film thickness information in a non-transitory computer-readable medium; and
the computerized controller device comparing the threshold lubricant film thickness to the actual lubricant film thickness ($h_{actual}$),
wherein when the actual lubricant film thickness ($h_{actual}$) is different from the threshold lubricant film thickness, the computerized controller device takes an action on the chiller to change the actual lubricant film thickness ($h_{actual}$).

Aspect 10. The method as in aspect 9, wherein the threshold lubricant film thickness is a minimum lubricant film thickness ($h_{min}$).

Aspect 11. The method as in aspect 10, wherein when $h_{actual} < h_{min}$, the computerized controller device takes an action on the chiller to increase the actual lubricant film thickness ($h_{actual}$).

Aspect 12. The method as in any one or combinations of the aspects 9-11, wherein the action comprises increasing the rotation speed of the bearing of the chiller.

Aspect 13. The method as in any one or combinations of the aspects 9-12, wherein the action comprises lowering the refrigerant fluid temperature.

Aspect 14. The method as in any one or combinations of the aspects 9-13, wherein the action comprises changing a phase of a refrigerant fluid.

Aspect 15. The method as in any one or combinations of the aspects 10-14, further comprising:
repeating the action on the chiller to increase $h_{actual}$ until $h_{actual} \leq h_{min}$ Aspect 16. The method as in any one or combinations of the aspects 10-15, further comprising:
after the computerized controller device has taken the action on the chiller to increase $h_{actual}$, the computerized controller device determining that $h_{actual} < h_{min}$ condition has lasted a predetermined amount of time.

Aspect 17. The method as in aspect 16, further comprising:
after the computerized controller device has determined that $h_{actual} < h_{min}$ condition has lasted the predetermined amount of time, the computerized controller device shutting down the chiller.

Preferred embodiments have been described. Those skilled in the art will appreciate that various modifications and substitutions are possible, without departing from the scope of the invention as claimed and disclosed, including the full scope of equivalents thereof. It is noted that any of the features in any of the claim(s) below can be combined with any of the other claim(s).

What is claimed is:

1. A chiller system, comprising:
a refrigeration circuit configured to circulate a refrigerant, including:
an oil-free compressor having a drive motor and a bearing, the bearing configured to receive a flow of the refrigerant;
a condenser;
an evaporator;
a liquid temperature affecting device configured to affect a temperature of the flow of the refrigerant, the liquid temperature affecting device including a heat exchanger configured to receive liquid refrigerant from the chiller system; and
a controller configured to:
determine a film thickness of refrigerant at the bearing; and
adjust an output temperature of the liquid temperature affecting device based on the film thickness.

2. The chiller system of claim 1, wherein the heat exchanger is configured to receive the liquid refrigerant from the refrigeration circuit from a point between the condenser and the evaporator.

3. The chiller system of claim 1, wherein the heat exchanger is a brazed plate heat exchanger.

4. The chiller system of claim 1, further comprising a modifier configured to adjust an inlet temperature at the heat exchanger for refrigerant exchanging heat with the flow of refrigerant.

5. The chiller system of claim 4, wherein the controller is configured to adjust the output temperature of the flow of refrigerant by controlling the modifier.

6. The chiller system of claim 1, further comprising a temperature sensor configured to measure the temperature of the flow of the refrigerant, wherein the controller is configured to determine the film thickness based at least in part on the temperature of the flow of the refrigerant.

7. The chiller system of claim 4, further comprising a pressure sensor configured to measure a pressure of the refrigerant at the condenser, wherein the controller is further configured to determine film thickness further based on the pressure of the refrigerant at the condenser.

8. The chiller system of claim 1, wherein the controller is configured to determine the film thickness based at least in part on a speed of rotation of the drive motor.

9. A controller for a chiller system, configured to:
receive refrigerant lubrication parameters including at least one of a temperature of refrigerant at a bearing in an oil-free chiller, a condenser pressure of the chiller system, or a speed of rotation of a drive motor of the chiller system;
determine film thickness of the refrigerant at the bearing in the oil-free chiller based on the refrigerant lubrication parameters; and
direct adjustment of a temperature of a flow of the refrigerant from a heat exchanger to the bearing based on the determined film thickness, the heat exchanger configured to receive liquid refrigerant from the chiller system.

10. The controller of claim 9, wherein the controller is configured to direct adjustment of the temperature of the flow of the refrigerant by controlling the heat exchanger to affect the temperature of the flow of the refrigerant.

11. The controller of claim 9, wherein the controller is configured to direct adjustment of the temperature of the flow of the refrigerant by altering operation of a modifier configured to adjust a temperature of a fluid exchanging heat with the flow of the refrigerant.

12. A method for controlling a chiller system, comprising:
obtaining refrigerant lubrication parameters including at least one of a temperature of refrigerant at a bearing in an oil-free chiller, a condenser pressure of the chiller system, or a speed of rotation of a drive motor of the chiller system;
determining, using a controller, film thickness of the refrigerant at the bearing in the oil-free chiller based on the refrigerant lubrication parameters; and
adjusting a temperature of a flow of the refrigerant from a heat exchanger to the bearing based on the determined film thickness, the heat exchanger configured to receive liquid refrigerant from the chiller system.

13. The method of claim 12, wherein adjusting the temperature of the flow includes controlling the heat exchanger to affect the temperature of the flow of the refrigerant.

14. The method of claim 13, wherein the heat exchanger is a brazed plate heat exchanger.

15. The method of claim 13, wherein the heat exchanger adjusts the temperature by receiving a relatively cool refrigerant from a point between a condenser and an evaporator of the chiller, and exchanging heat between the flow of refrigerant and the relatively cool refrigerant.

16. The method of claim 12, wherein adjusting the temperature of the flow includes altering operation of a modifier configured to adjust a temperature of a fluid exchanging heat with the flow of the refrigerant.

17. The method of claim 12, wherein adjusting the temperature of the flow of refrigerant to the bearing based on the determined film thickness includes reducing a temperature of the flow of refrigerant to the bearing when the determined film thickness is below a threshold film thickness.

18. The method of claim 17, wherein the threshold film thickness is based on an operating mode of the chiller.

19. The method of claim 17, wherein the threshold film thickness is a range of values.

20. The method of claim 17, further comprising determining whether the threshold film thickness can or cannot be achieved, and shutting down the chiller when the threshold film thickness cannot be achieved.

\* \* \* \* \*